United States Patent
Gebauer et al.

(10) Patent No.: US 11,369,248 B2
(45) Date of Patent: Jun. 28, 2022

(54) WATER-USING HOUSEHOLD APPLIANCE AND METHOD

(71) Applicant: BSH Hausgeräte GmbH, Munich (DE)

(72) Inventors: Hans Gebauer, Lauingen (DE); Werner Haltmayer, Dinkelsbühl (DE); Sami Bisgin, Dillingen (DE)

(73) Assignee: BSH Hausgeräte GmbH, Munich (DE)

( * ) Notice: Subject to any disclaimer, the term of this patent is extended or adjusted under 35 U.S.C. 154(b) by 133 days.

(21) Appl. No.: 16/613,818

(22) PCT Filed: Jun. 15, 2018

(86) PCT No.: PCT/EP2018/065982
§ 371 (c)(1),
(2) Date: Nov. 15, 2019

(87) PCT Pub. No.: WO2019/007663
PCT Pub. Date: Jan. 10, 2019

(65) Prior Publication Data
US 2020/0170480 A1    Jun. 4, 2020

(30) Foreign Application Priority Data
Jul. 7, 2017   (DE) .................... 10 2017 211 670.6

(51) Int. Cl.
| | |
|---|---|
| *A47L 15/42* | (2006.01) |
| *B29C 65/16* | (2006.01) |
| *B29C 65/44* | (2006.01) |
| *B29C 65/00* | (2006.01) |
| *B29L 31/00* | (2006.01) |
| *D06F 39/12* | (2006.01) |

(52) U.S. Cl.
CPC ....... *A47L 15/4246* (2013.01); *A47L 15/4291* (2013.01); *B29C 65/1635* (2013.01);
(Continued)

(58) Field of Classification Search
CPC ............. A47L 15/4246; A47L 15/4291; A47L 15/4285; A47L 2501/02; A47L 2501/26;
(Continued)

(56) References Cited

U.S. PATENT DOCUMENTS

| | | |
|---|---|---|
| 2005/0042456 A1 | 2/2005 | Krause et al. |
| 2009/0095335 A1 | 4/2009 | Buehlmeyer |

(Continued)

FOREIGN PATENT DOCUMENTS

| | | |
|---|---|---|
| CN | 2927977 Y | 8/2007 |
| CN | 101217062 A * | 7/2008 |

(Continued)

OTHER PUBLICATIONS

English translation of JP2012232531A.*
(Continued)

*Primary Examiner* — Michael E Barr
*Assistant Examiner* — Pallavi Chitta
(74) *Attorney, Agent, or Firm* — Michael E. Tschupp; Andre Pallapies; Brandon G. Braun (57) ABSTRACT

A water-using household appliance, in particular a household dishwashing machine, includes a wall which is made from a metal material, and a device which is made from a plastic material and fixedly connected to the wall by a laser weld.

13 Claims, 4 Drawing Sheets

(52) U.S. Cl.
CPC ....... *A47L 15/4285* (2013.01); *A47L 2501/02* (2013.01); *A47L 2501/26* (2013.01); *B29C 65/44* (2013.01); *B29C 66/74283* (2013.01); *B29C 2791/009* (2013.01); *B29L 2031/762* (2013.01); *D06F 39/12* (2013.01)

(58) Field of Classification Search
CPC .............. A47L 15/4217; A47L 15/4223; A47L 15/4225; A47L 15/483; B29C 65/1635; B29C 65/44; B29C 66/74283; B29C 2791/009; B29C 66/71; B29C 66/7212; B29C 66/0246; B29C 66/131; B29C 66/532; B29C 65/20; B29C 65/16; B29C 66/112; B29C 66/3032; B29C 66/742; B29C 65/167; B29L 2031/762; D06F 39/12; A47J 31/4403
See application file for complete search history.

(56) References Cited

U.S. PATENT DOCUMENTS

| 2011/0048472 A1 | 3/2011 | Heissler |
| 2012/0118025 A1 | 5/2012 | Ratfisch |
| 2020/0196829 A1 | 6/2020 | Budzynski |

FOREIGN PATENT DOCUMENTS

| CN | 103057117 A | | 4/2013 | |
| CN | 106273414 A | | 1/2017 | |
| DE | 102011086788 A1 | * | 5/2013 | |
| DE | 102011086788 A1 | * | 5/2013 | ......... A47L 15/4291 |
| DE | 102011086788 A1 | | 5/2013 | |
| EP | 2602083 A1 | * | 6/2013 | |
| JP | 2012232531 A | * | 11/2012 | |
| JP | 2012232531 A | | 11/2012 | |
| JP | 2016150375 A | * | 8/2016 | ......... B23K 26/0622 |
| KR | 20150064567 A | * | 6/2015 | |

OTHER PUBLICATIONS

English translation of DE102011086788A1.*
NPL-1 A. Temmler and M. A. Walochnik Surface structuring by remelting of titanium alloy Ti6Al4V, Published Online: Feb. 26, 2015 Journal of Laser Applications 27, S29103 (2015); https://doi.org/10.2351/1.4906387 (Year: 2015).*
International Search Report PCT/EP2018/065982 dated Sep. 21, 2018.
National Search Report CN 2018800451835 dated Mar. 3, 2021.

* cited by examiner

WATER-USING HOUSEHOLD APPLIANCE AND METHOD

CROSS-REFERENCES TO RELATED APPLICATIONS

This application is the U.S. National Stage of International Application No. PCT/EP2018/065982, filed Jun. 15, 2018, which designated the United States and has been published as International Publication No. WO 2019/007663 A1 and which claims the priority of German Patent Application, Serial No. 10 2017 211 670.6, filed Jul. 7, 2017, pursuant to 35 U.S.C. 119(a)-(d).

BACKGROUND OF THE INVENTION

The present invention relates to a water-using household appliance, in particular a household dishwashing machine, and a method for producing such a water-using household appliance.

Water-using household appliances, such as for example dishwashing machines, may have in addition to a washing container a further liquid container, such as for example a heat exchanger or a holder for heating pipes, which is attached to the washing container and which is thermally coupled to the washing container.

The publication DE 10 2011 086 788 A1 discloses a water-using household appliance having a washing container, a water-using component being arranged on the outer face thereof, wherein a liquid chamber of the water-using component is at least partially defined by at least one side wall of the washing container, and wherein the water-using component is fastened to the washing container via at least one adhesively bonded connection.

BRIEF SUMMARY OF THE INVENTION

In view of this background to the invention, an object of the present invention is to provide an improved water-using household appliance, in particular a household dishwashing machine.

Accordingly, a water-using household appliance, in particular a household dishwashing machine, is proposed. The water-using household appliance, in particular the household dishwashing machine, comprises a wall which is made from a metal material and a device which is provided on the wall and which is made from a plastic material, wherein said device is fixedly connected to the wall by means of a laser weld.

Since the device is fixedly connected to the wall by means of the laser weld, a step of adhesively bonding the device to the wall may be dispensed with. As a result, the water-using household appliance may be produced more cost-effectively.

The wall is, in particular, a side wall of the washing container. The wall may be configured, for example, from the material 1.4301, 1.4310, 1.4510 or 1.4016. The water-using household appliance may have a plurality of such devices which may be provided on different walls of the water-using household appliance. The device, however, may also be made at least partially from a metal material. In particular, however, at least that region of the device which is connected to the wall is made from the plastic material. The plastic material may, for example, be a polypropylene (PP), in particular a natural PP, a PP which is filled with a bulking agent, such as for example PP talc 20 (PPTD20) or for example PP talc 30 (PPTD30), an acrylonitrile-butadiene-styrene copolymer (ABS), a polymethyl methacrylate (PMMA), a polyvinylchloride (PVC), a polyoxymethylene (POM), a polyamide (PA), in particular a glass fiber-filled PA, for example a PA 6.6 GF 20 or a PA 6.6 GF 30, or a thermoplastic elastomer (TPE). Alternatively, other plastic materials may also be used. The device is preferably a plastic injection-molded component. As a result, the device may be produced cost-effectively in large quantities.

The water-using household appliance is preferably a household dishwashing machine. The water-using household appliance, however, may also be a household washing machine or any other water-using household appliance, such as for example a coffee machine or the like. The water-using household appliance is denoted hereinafter as a household appliance. Hereinafter it is assumed that the household appliance is a household dishwashing machine.

Preferably, the device is water-using. Thus the device may also be denoted as a water-using device. Examples of water-using devices are a heat exchanger, a water inlet, a water outlet, a pump sump or the like. However, the device may also not use any water. In this case, the device may be a holder for a heating wire or a heating pipe, for example. For example, the device may be configured as a half-shell, the heating wires and/or heating pipes being snapped or clipped therein. However, it is assumed hereinafter that the device is water-using.

In a development of the household appliance in which the device is water-using, the household appliance comprises a wall which is made from a metal material, a water-using device which is provided on the wall and which is made from a plastic material, and a liquid chamber which is defined by the wall and the device, wherein the device is fixedly connected to the wall by means of a laser weld.

Since the liquid chamber remote from the device is defined only by the wall which is made from the metal material, the heat transfer from the liquid chamber to a washing chamber provided on an inner face of the wall remote from the device and vice-versa may be significantly improved.

According to one embodiment, the invention has a fastening flange which is fixedly connected to the wall by means of the laser weld.

The fastening flange, for example, has a width of 2 to 20 mm. The fastening flange preferably entirely surrounds the device. In the region in which the fastening flange bears against the wall, this wall may be provided with a surface structuring. The surface structuring may have a plurality of recesses arranged in a linear manner. In this case, the recesses may be arranged horizontally, vertically or obliquely. The surface structuring may also have an arrangement of recesses which is arranged in the shape of a matrix or in the manner of a chessboard, said recesses being oriented in a variable manner. The recesses may be linear, curved, circular or have any other geometry.

According to a further embodiment, the device is a heat exchanger, a water inlet or a holder for a heating wire or a heating pipe.

The device may also be any other water-using component of the household appliance. For example, the device may also be a water outlet, a pump sump or the like.

According to a further embodiment, the device comprises a storage portion and a functional portion.

The storage portion is designed, in particular, to store water and/or washing liquor. The storage portion is directly connected to the wall. The functional portion may comprise, for example, a plurality of water channels, valves, control elements or other systems. The storage portion is preferably a component which is made separately from the functional portion. The storage portion and the functional portion may be fixedly connected together. Alternatively, the storage portion and the functional portion may also be configured integrally from the same material.

According to a further embodiment, the wall is made from a chromium steel or chromium-nickel steel.

In particular, the wall is a thin plate. In other words, the wall has a wall thickness of less than 1.3 mm, in particular of approximately 0.35 to 0.5 mm. For example, the materials 1.4301, 1.4310, 1.4510 or 1.4016 may be used.

According to a further embodiment, the wall is part of a washing container of the household appliance.

The washing container preferably comprises a first wall, in particular a base, a second wall, in particular a cover, a third wall, in particular a rear wall, a fourth wall, in particular a first side wall, and a fifth wall, in particular a second side wall. The household appliance may comprise a plurality of devices which are provided on different walls of the washing container. The washing container may also comprise a door which is pivotably mounted thereon.

Moreover, a method for producing a water-using household appliance, in particular a household dishwashing machine, is proposed. The method comprises the steps: providing a wall which is made from a metal material and a device which is made from a plastic material, arranging the device on the wall and laser-welding the device to the wall.

When providing the device, said device may be made in a plastic injection-molding method, for example. The laser welding of the device to the wall may be carried out, for example, by heat conduction welding or laser transmission welding.

In heat conduction welding, the laser beam melts the joining partners along the joining point, wherein radiation intensities of up to 100 kW/cm$^2$ are generally used. Since metals may have a reflectivity of up to 95% for laser beams depending on the radiated wavelength, the intensity is insufficient to produce a vapor capillary (keyhole). The molten masses flow into one another and solidify to form a weld seam. Heat conduction welding is used in order to connect thin-walled parts, for example corner seams on visible edges of housings. Further applications are in electronics. The laser generates a smooth, rounded weld seam which does not have to be subjected to any further post-treatment. Pulsed or continuous wave mode solid body lasers are suitable for the aforementioned applications. In heat conduction welding the energy only passes into the workpiece by heat conduction. Thus the seam depth ranges from only a few tenths of a millimeter to one millimeter. The heat conductivity of the material limits the maximum seam depth. The seam width is always greater than the seam depth. If the heat is not able to flow away sufficiently rapidly the processing temperature rises above the evaporation temperature. Metal vapor is produced, the penetration depth increases sharply and the process changes to deep welding. Heat conduction welding is generally carried out in an overlap method with an overlap of at least 3 mm, preferably of at least 4 mm.

Laser transmission welding is generally carried out in an overlap method with an overlap of at least 3 mm, preferably of at least 4 mm. In this case, two different welding partners are used. The upper welding partner, for example a plastic material, is transparent relative to the laser wavelength used. The laser radiates through this plastic material virtually unhindered. Due to the transparency the plastic material barely heats up.

The lower welding partner, for example an in particular aforementioned metal material, has to absorb the radiation. For example, an addition of absorbent particles (approximately 0.3% w/w carbon black) may contribute thereto. This substance absorbs energy, starts to melt and at the same time also transfers the resulting heat by heat conduction to the upper partner. So that the energy transfer and a material contact take place, both partners often have to be pressed together, but at least so as to fit together accurately. As a result of the coalescence of the two substances, a weld seam may be produced. The welding energy has to be selected such that the laser penetrates the workpiece only by approximately 60%. If the laser welding is carried out from both sides, full penetration welding is ensured. Output power which is too high should be avoided since it may lead to damage to the metal. Efficient diode lasers are frequently used therefor, said diode lasers with the required low output power of, for example, 5 to 150 Watts having a sufficient beam quality for this welding method.

In simultaneous welding, the entire weld seam is heated at the same time (simultaneously). Whilst a linear weld seam may be produced in a simple manner, radii may be formed only in an approximate manner in the weld seam by successive rows of laser diodes or radii have to be created by additional beam-forming elements. To achieve the required uniform power density distribution over the entire weld seam, it is necessary to arrange the individual laser elements correspondingly and to control the individual laser elements separately.

In a development of the method, the device is water-using. Thus the method comprises the steps: providing a wall which is made from a metal material and a water-using device which is made from a plastic material. Arranging the device on the wall to form a liquid chamber which is defined by the wall and the device and laser-welding the device to the wall.

According to one embodiment, before arranging the device on the wall a surface structuring is at least partially produced thereon.

The surface structuring may have a plurality of recesses arranged in a linear manner. The recesses in this case may be arranged horizontally, vertically or obliquely. The recesses may have any geometry. For example, the recesses may be linear, curved, wave-shaped or the like. The recesses may, for example, have a depth of 10 to 100 μm, preferably of 15 to 90 μm, in particular of 20 to 80 μm.

According to a further embodiment, the surface structuring is carried out by means of nano-pulsed laser beams.

This surface structuring has the following basic data, based on numerous tests: a mean output power of approximately 20 W, an output power per unit area of approximately 0.2 cm$^2$/s, a pulse frequency of 20 to 100 kHz and a wavelength of 1064 nm. The matrix of the respective surface structuring has an output power of 20 to 100%, a frequency of 20 to 80 kHz and a constant feed rate of approximately 200 mm/s. The line spacing of the nano-pulsed laser beams is approximately 0.12 mm.

The laser structuring in the nano-pulsed mode of the laser may be determined by means of a laser-scanning microscope (LSM) both in 2D and in 3D. The laser structuring is generally characterized by areas of removed material and structural recesses, optionally also by embedding means. The areas of removed material preferably have an average spacing ranging from 30 to 120 μm, preferably from 40 to 110 μm, in particular from 50 to 100 μm. The structural recesses, however, have an average depth of 10 to 100 μm, preferably of 15 to 90 μm, in particular of 20 to 80 μm.

A "pulsed laser" is understood as a laser which does not continuously emit light but is operated in a pulsed manner, in other words the light is emitted in chronologically defined periods. When the surface structuring is introduced, the wall is at least partially melted. When melted, the material of the wall at least partially evaporates and/or molten material is ejected from the recess. As a result, raised portions are produced at the side of the recess. The surface structuring, in particular, has undercuts into which the molten plastic material of the device may flow. As a result, a positive connection of the device to the wall is produced. A positive connection is produced by the interlocking or rear engagement of at least two connection partners, in this case the recesses and the plastic material of the device.

Alternatively, the surface structuring may also be carried out by means of continuous wave laser radiation.

This surface structuring has the following basic data, based on numerous tests: a maximum output power of 400 W, an output power per unit area of approximately 0.84 $cm^2/s$ and a wavelength of 1070 nm. The matrix of the respective surface structuring has an output power of 100 to 400 W, with one to five passes and a constant feed rate of approximately 10,000 mm/s. The line spacing of the continuous wave laser radiation is approximately 0.12 mm.

In the continuous wave mode of the laser, the laser structuring may be ascertained by means of a laser scanning microscope (LSM) both in 2D and in 3D. The laser structuring is generally characterized by areas of removed material and structural recesses, optionally also by embedding means. Areas of removed material preferably have an average spacing ranging from 30 to 120 µm, preferably from 40 to 110 µm, in particular from 50 to 100 µm. Structural recesses, however, have an average depth of 10 to 100 µm, preferably of 15 to 90 µm, in particular of 20 to 80 µm.

According to a further embodiment, a fastening flange of the device is laser-welded to the wall.

The fastening flange preferably entirely surrounds the device. The fastening flange may have, for example, a width of 2 to 20 mm. The fastening flange, in particular, bears flat against the wall.

Further possible implementations of the household appliance and/or the method also comprise not explicitly cited combinations of features or embodiments described above and/or below relative to the exemplary embodiments. In this case, the person skilled in the art may also add individual features as improvements or additions to the respective basic form of the household appliance and/or the method.

Further advantageous embodiments and features of the household appliance and/or the method form the subject-matter of the subclaims and the exemplary embodiments described hereinafter of the household appliance and/or the method. The household appliance and/or the method are described in more detail by means of preferred embodiments with reference to the accompanying figures.

DETAILED DESCRIPTION OF EXEMPLARY EMBODIMENTS OF THE PRESENT INVENTION

Elements which are the same or functionally the same have been provided with the same reference numerals in the figures unless indicated otherwise.

Figure 1:
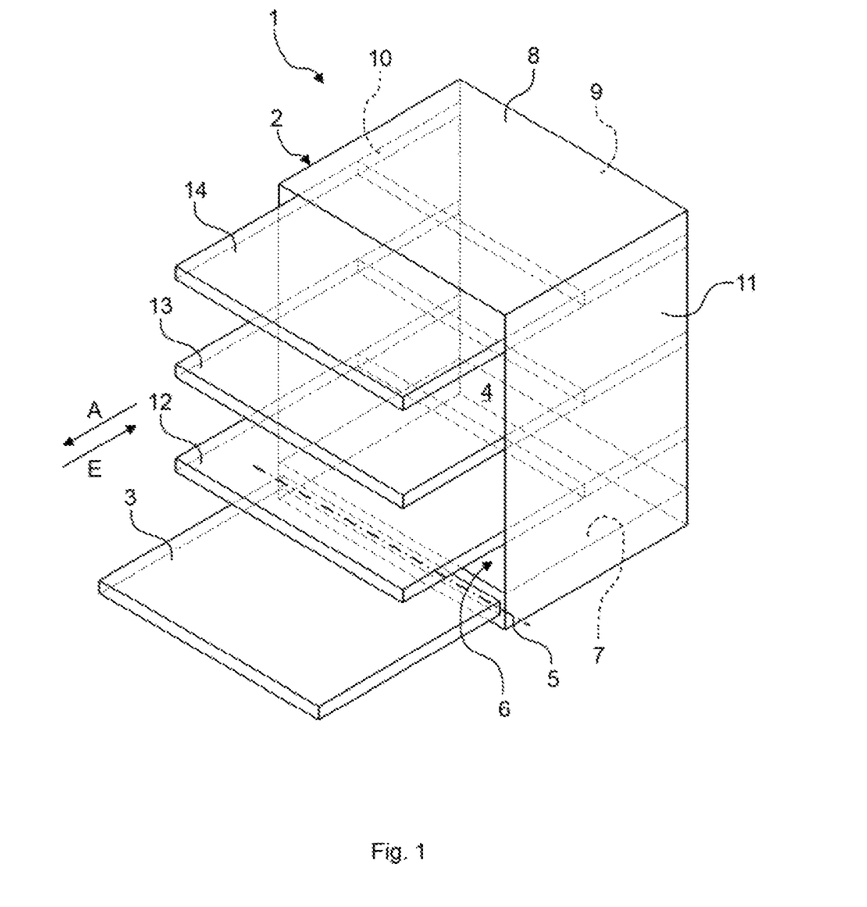
FIG. 1 shows a schematic perspective view of an embodiment of a household appliance.

FIG. 1 shows a schematic perspective view of an embodiment of a water-using household appliance 1. The household appliance 1 may be, for example, a household dishwashing machine, a household washing machine or any other household appliance, such as for example a coffee machine or the like. It is assumed hereinafter that the household appliance 1 is a household dishwashing machine. The household appliance 1 comprises a washing container 2 which is able to be closed by a door 3, in particular in a watertight manner. To this end, a sealing device may be provided between the door 3 and the washing container 2. The washing container 2 is preferably cuboidal. The washing container 2 may be arranged in a housing of the household appliance 1. The washing container 2 and the door 3 may form a washing chamber 4 for washing items to be washed.

The door 3 is shown in FIG. 1 in its open position. The door 3 may be opened or closed by pivoting about a pivot axis 5 provided at a lower end of the door 3. A loading opening 6 of the washing container 2 may be closed or opened by means of the door 3. The washing container 2 has a plurality of walls 7 to 11. The washing container 2 preferably comprises a first wall 7, in particular a base, a second wall 8 arranged opposite the first wall 7, in particular a cover, a third wall 9 arranged opposite the closed door 3, in particular a rear wall, a fourth wall 10, in particular a first side wall, and a fifth wall 11 arranged opposite the fourth wall 10, in particular a second side wall.

The first wall 7, the second wall 8, the third wall 9, the fourth wall 10 and the fifth wall 11 may be made, for example, from a stainless steel plate. For example, a rust-free stainless steel with the material identification number 1.4301, 1.4310, 1.4510 or 1.4016 is suitable for the material. Alternatively, the first wall 7 may be made from a plastic material, for example. The washing container 2 may be arranged on a base carrier, not shown. The base carrier is preferably a plastic component. In particular, the base carrier may be a plastic injection-molded component.

The household appliance 1 also has at least one receiver for items to be washed 12 to 14. Preferably, a plurality of receivers for items to be washed 12 to 14, for example three, may be provided, wherein the receiver for items to be washed 12 may be a lower receiver for items to be washed or a lower basket, the receiver for items to be washed 13 may be an upper receiver for items to be washed or an upper basket and the receiver for items to be washed 14 may be a cutlery drawer. As FIG. 1 further shows, the receivers for items to be washed 12 to 14 are arranged superimposed in the washing container 2. Each receiver for items to be washed 12 to 14 is optionally displaceable into or out of said washing container 2. In particular, each receiver for items to be washed 12 to 14 is able to be inserted in an insertion direction E (arrow) into the washing container 2 and withdrawn counter to the insertion direction E (arrow) in a withdrawal direction A (arrow) out of the washing container 2.

Figure 2:
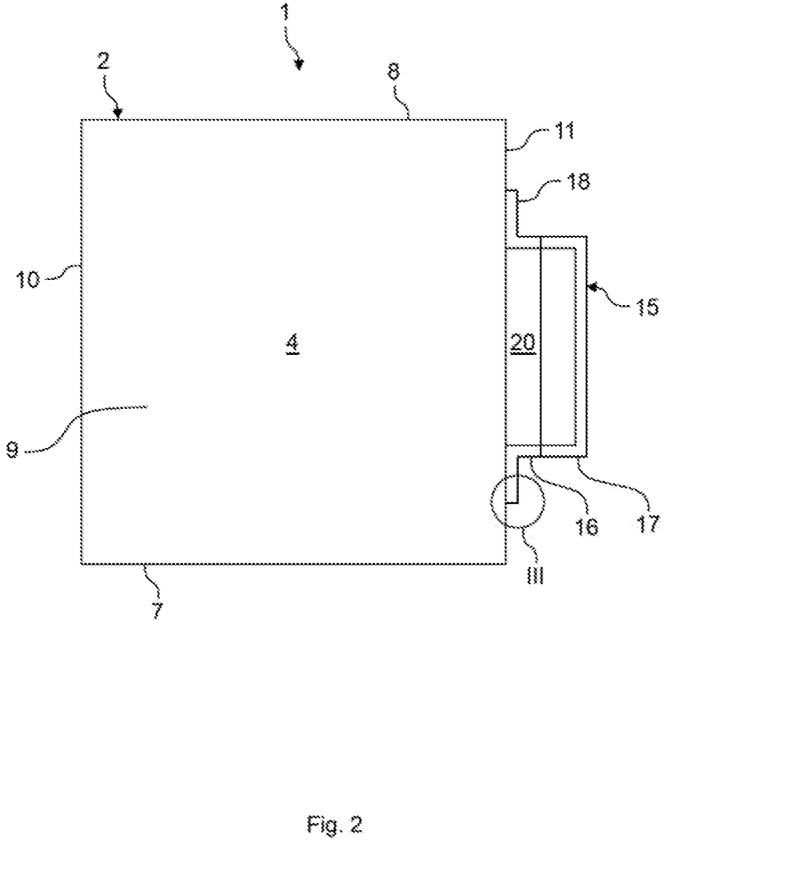
FIG. 2 shows a schematic sectional view of the household appliance according to FIG. 1.

FIG. 2 shows a schematic sectional view of the household appliance 1. The household appliance 1 comprises a device 15 which may be provided on one of the walls 7 to 11. Preferably the device 15 is water-using. Thus the device 15 may also be denoted as a water-using device. Examples of water-using devices 15 are a heat exchanger, a water inlet, a water outlet, a pump sump or the like. However, the device 15 may also not use any water. In this case, the device 15 may be a holder for a heating wire or a heating pipe, for example. The device 15 may be configured as a half-shell, for example, heating wires and/or heating pipes being able to be snapped or clipped therein. However, it is assumed hereinafter that the device 15 is water-using.

Preferably, the device 15 is provided on the fourth wall 10 or on the fifth wall 11. Moreover, the device 15 may also be provided on the third wall 9 or on the second wall 8. A plurality of devices 15 may also be provided. In FIG. 2, however, only one device 15 which is provided on the fifth wall 11 is shown.

As mentioned above, the device 15 may be, for example, a heat exchanger or a water inlet. If the device 15 is a heat exchanger, this device may comprise a storage portion 16 and a functional portion 17. The storage portion 16 and the functional portion 17 may be components which are made separately from one another and which are fixedly connected together. Alternatively, the storage portion 16 and the functional portion 17 may also be configured integrally from the same material.

The storage portion 16 is designed to store water and/or washing liquor. The functional portion 17 may comprise, for example, channels, valves, different systems or the like. The device 15 may be designed to store energy, in particular heat energy, for example in the form of heated water. This heat energy may be dissipated to the washing container 2. Conversely, energy may also be transferred from the washing container 2 to the device 15.

The device 15 and, in particular, the storage portion 16 are preferably made from a plastic material. For example, polypropylene (PP), in particular a natural PP, a PP filled with a bulking agent, such as for example talc, for example PP talc 20 (PPTD20) or for example PP talc 30 (PPTD30), acrylonitrile-butadiene-styrene copolymer (ABS), polymethyl methacrylate (PMMA), polyvinylchloride (PVC), polyoxymethylene (POM), polyamide (PA), in particular glass fiber-filled polyamide, such as for example PA 6.6 GF 20 or PA 6.6 GF 30, or a thermoplastic elastomer (TPE) are suitable as the plastic material. The device 15 may also be made from different plastic materials. Moreover, the device 15 may also be made at least partially from a metal material. For example, a rust-free stainless steel with the material identification number 1.4301, 1.4310, 1.4510 or 1.4016 is suitable as the metal material.

The storage portion 16 is configured in the form of a half-shell or trough which is configured to be open in the direction of the fifth wall 11. For connecting the storage portion 16 to the fifth wall 11 the device 15 comprises a fastening flange 18 which preferably entirely surrounds the storage portion 16 and, in particular, the device 15. The fastening flange 18 may have a width of approximately 5 to 20 mm.

Figure 3:
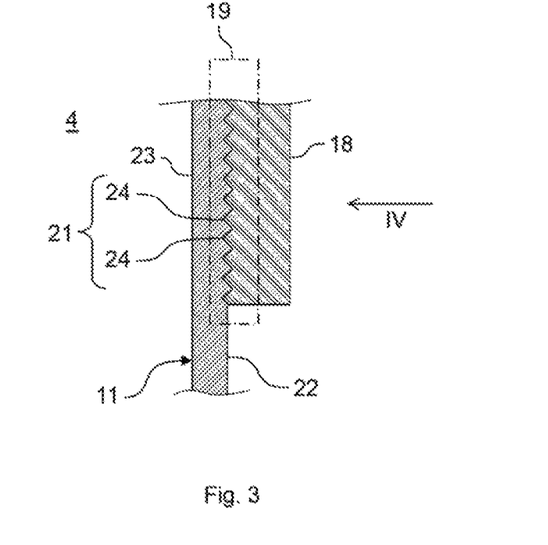
FIG. 3 shows the detailed view III according to FIG. 2.

The fastening flange 18 is entirely made from a plastic material. The device 15 and, in particular, the storage portion 16 are connected in a fixed and watertight manner to the fifth wall 11 by means of laser weld 19 (FIG. 3). The device 15 and, in particular, the storage portion 16 thus enclose with the fifth wall 11 a liquid chamber 20. In other words, the liquid chamber 20 is only separated from the washing chamber 4 by the fifth wall 11, i.e. only by the metal material of the fifth wall 11. As a result, a particularly good heat transfer is ensured from the liquid chamber 20 to the washing chamber 4 and vice-versa. As a result, optimal diffusion ratios between the liquid chamber 20 and the washing chamber 4 may be achieved. Thus, the energy balance of the household appliance 1 is significantly improved in comparison with an arrangement in which a further plastic layer is provided between the liquid chamber 20 and the fifth wall 11.

The functional portion 17 comprises a half-shell made from a plastic material which contains the aforementioned channels, valves and/or further systems. The functional portion 17 may be seal-welded by means of a film and a laser welding method. In this case, the use of the film also improves the diffusion conditions and thus the energy balance of the household appliance 1.

The aforementioned advantages may also be utilized if the device 15 is a water inlet. The device 15 may also be designed as a composite component in which initially the functional portion 17 is seal-welded by means of the aforementioned film and then the storage portion 16 is directly joined to the fifth wall 11 by means of the laser welding method, in particular by means of a short-pulse laser.

Figure 4:
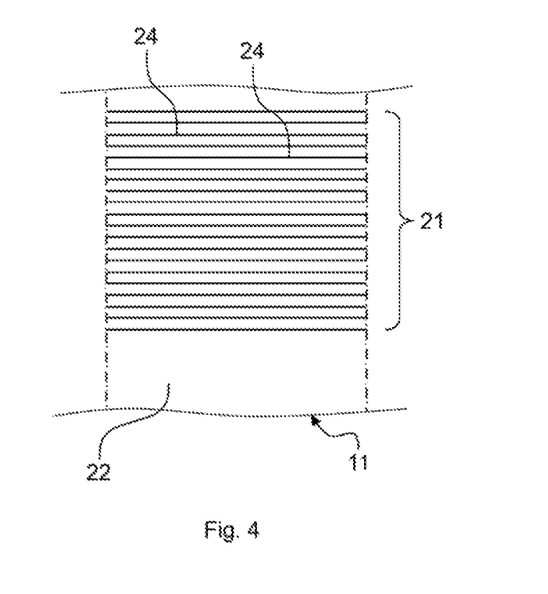
FIG. 4 shows the detailed view IV according to FIG. 3.

The washing container 2 and, in particular, the fifth wall 11 are made from a chromium steel or chromium-nickel steel. In particular, the fifth wall 11 is a thin plate. Thin plates are plates which have a thickness of less than 3 mm. In order to achieve a reliable and permanent connection of the fastening flange 18 to the fifth wall 11, the fifth wall 11 is provided with a surface structuring 21 in the region of the laser weld 19 (FIG. 3 and FIG. 4). The surface structuring 21 is introduced, for example by means of a nano-pulsed laser, into an outer face 22 of the fifth wall 11 remote from the washing chamber 4. The depth of the surface structuring 21 in this case is selected such that by the use of inert gas on an inner face 23 of the fifth wall 11 no oxidation dyes are present. The surface structuring 21 serves firstly for increasing the surface of the outer face 22 and the surface structuring 21 preferably also forms undercuts, the molten plastic material of the fastening flange 18 flowing therein and being positively connected to the undercuts.

The surface structuring 21 may comprise a plurality of recesses 24 arranged in a linear manner, in FIG. 3 and FIG. 4 however only two being provided with a reference numeral. The recesses 24 may be arranged horizontally in the orientation of FIG. 3 and FIG. 4. The recesses 24, however, may also be positioned vertically or obliquely. In contrast to the view in FIG. 3 and FIG. 4 the recesses 24 may also have a curved, circular or any other geometry. The surface structuring 21 may also comprise recesses 24 arranged in the manner of a chessboard or in the shape of a matrix with variable orientation. As a result, the connection of the fastening flange 18 to the surface structuring 21 may be further improved.

For example, the materials 1.4301, 1.4310, 1.4510 or 1.4016 may be used for the fifth wall 11 but also for the other walls 7 to 10. The recesses 24 of the surface structuring 21, for example, may have a depth of 10 to 100 µm, preferably of 15 to 90 µm, in particular of 20 to 80 µm. Raised portions which are produced by the material of the fifth wall 11 being melted around the recesses and being ejected from the recesses 24 may be formed to the side along the recesses 24.

Figure 5:
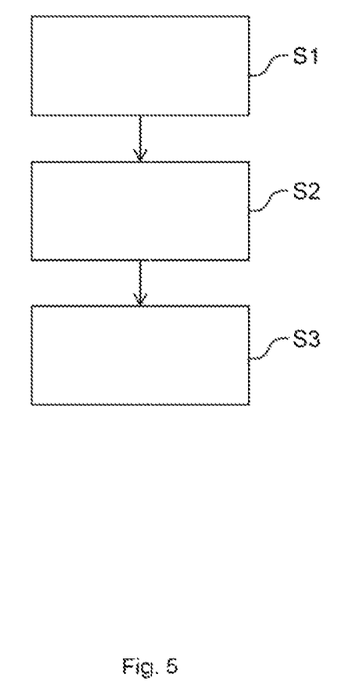
FIG. 5 shows a schematic block diagram of an embodiment of a method for producing the household appliance according to FIG. 1.

FIG. 5 shows a schematic block diagram of a method for producing the household appliance 1. In a step S1 the washing container 2 and, in particular, one of the walls 7 to 11 of the washing container 2 is provided. In this case, the wall 7 to 11 is formed from a metal material, in particular from the material 1.4301, 1.4310, 1.4510 or 1.4016. In step S1 the device 15 which is made at least partially from a plastic material is also provided. The device 15 may be produced, for example, in the step S1 by means of a plastic injection-molding method.

In a step S2 the device 15 is arranged on the wall 7 to 11, in order to form the liquid chamber 20. The liquid chamber 20 in this case is delimited by the corresponding wall 7 to 11 and the device 15, in particular the storage portion 16 of the device 15. In a step S3 the device 15 is laser-welded to the corresponding wall 7 to 11. For the welding process, preferably a diode laser is used, wherein a feed rate of the laser significantly predetermines the output power of the laser used. The device 15 is positioned by means of a clamping device relative to the corresponding wall 7 to 11 and pressed thereagainst.

The laser welding of the device 15 to the wall 7 to 11 may be carried out, for example, by means of a laser transmission welding method. In this case, the fastening flange 18 has a high transmittance of laser radiation in the laser wavelength range used. The laser radiation is then absorbed by the outer face 22, whereby the fastening flange 18 is at least partially melted thereon. Alternatively, the laser welding may also be carried out by means of a heat conduction joining. As a result, the corresponding wall 7 to 11, for example, may be heated from the inner face 23. The outer face 22 is then heated by heat conduction such that the fastening flange 18 is at least partially melted thereon. Before or during the arrangement of the device 15 on the corresponding wall 7 to 11 in the step S2, the corresponding wall 7 to 11 is at least partially subjected to surface structuring, as already described above. To this end, nano-pulsed laser beams are preferably used.

As a plastic wall is not provided between the liquid chamber 20 and the washing chamber 4, firstly the heat transfer from the liquid chamber 20 to the washing chamber 4 is significantly improved and secondly a material saving is achieved by the elimination of the plastic material. An expensive energy-intensive mirror welding process is dispensed with.

The storage portion 16 of the device 15 may be made in just one variant, the device 15 then being differentiated by the functional portion 17. The greatest advantage of the device 15 being welded directly onto the washing container 2 is in the significantly improved energy diffusion ratio and thus in the markedly improved energy balance. By eliminating the mirror welding, more cost-effective plastic materials with an improved flow index may be used. The injection-molding rate during injection-molding and thus the production capacity may be increased, whereby investment costs may be reduced. By the elimination of the mirror welding process and the use of linear laser welding in the film composite, plastic materials which have improved flow properties may be used. Higher injection-molding rates are also possible in this case. The elimination of the film also improves the diffusion ratios and thus the energy balance. In summary, a clear advantage is produced relative to material and process costs if the laser welding process is used.

Whilst the present invention has been described with reference to exemplary embodiments, the invention may be modified in many different ways.

The invention claimed is:

1. A water-using household appliance, comprising:
 a wall made from a metal material, the wall having a surface structuring formed on at least a portion thereof; and
 a device made from a plastic material and fixedly connected to the portion of the wall having the surface structuring by a laser weld,
 wherein the surface structuring comprises a plurality of recesses arranged in a linear manner on the wall,
 wherein each of the plurality of recesses extends continuously over a substantial portion of the wall having the surface structuring, and
 wherein the plurality of recesses is characterized by a sawtooth appearance when viewed together in cross-section.

2. The water-using household appliance of claim 1, constructed in the form of a household dishwashing machine.

3. The water-using household appliance of claim 1, wherein the device includes a fastening flange which is fixedly connected to the wall by the laser weld.

4. The water-using household appliance of claim 1, wherein the device is a heat exchanger, a water inlet or a holder for a heating wire or a heating pipe.

5. The water-using household appliance of claim 1, wherein the device is a heat exchanger which comprises a storage portion and a functional portion connected to the storage portion.

6. The water-using household appliance of claim 1, wherein the metal material of the wall is chromium steel or chromium-nickel steel.

7. The water-using household appliance of claim 1, further comprising a washing container, said wall being part of the washing container.

8. A method of producing a water-using household appliance, said method comprising:
 producing a surface structuring on at least a portion of a wall made from a metal material of the water-using household appliance;
 arranging a device made from a plastic material on the wall, the device being disposed opposite to the portion of the wall having the surface structuring; and
 laser-welding the device to the wall,
 wherein the surface structuring comprises a plurality of recesses arranged in a linear manner on the wall,
 wherein each of the plurality of recesses extends continuously over a substantial portion of the wall having the surface structuring, and
 wherein the plurality of recesses is characterized by a sawtooth appearance when viewed together in cross-section.

9. The method of claim 8, wherein the surface structuring is carried out by using pulsed laser beams, such that laser light is emitted in chronologically defined periods.

10. The method of claim 8, further comprising laser-welding a fastening flange of the device to the wall.

11. The method of claim 8 for producing a household dishwashing machine.

12. The method of claim 8, wherein the recesses are arranged horizontally in orientation on the wall.

13. The water-using household appliance of claim 1, wherein the recesses are arranged horizontally in orientation on the wall.

* * * * *